Feb. 20, 1940.　　　L. W. WHITCOMB　　　2,191,004
FISHING REEL
Filed Aug. 5, 1938　　　2 Sheets-Sheet 1
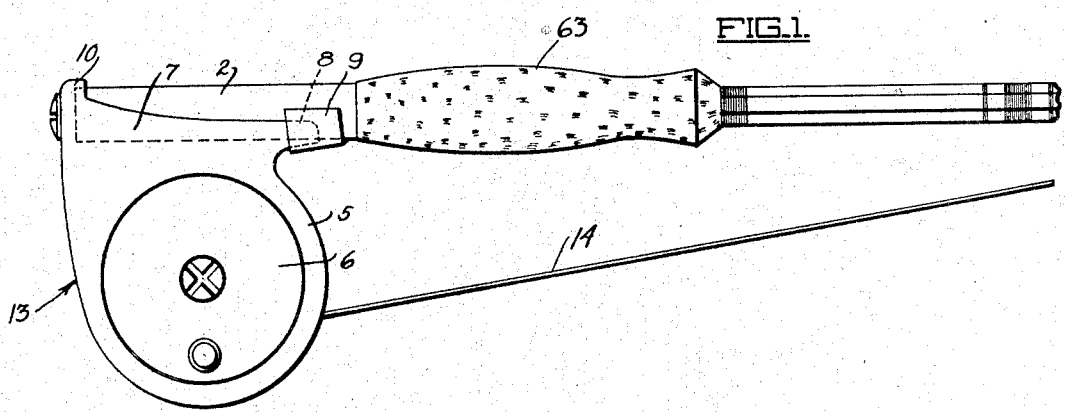
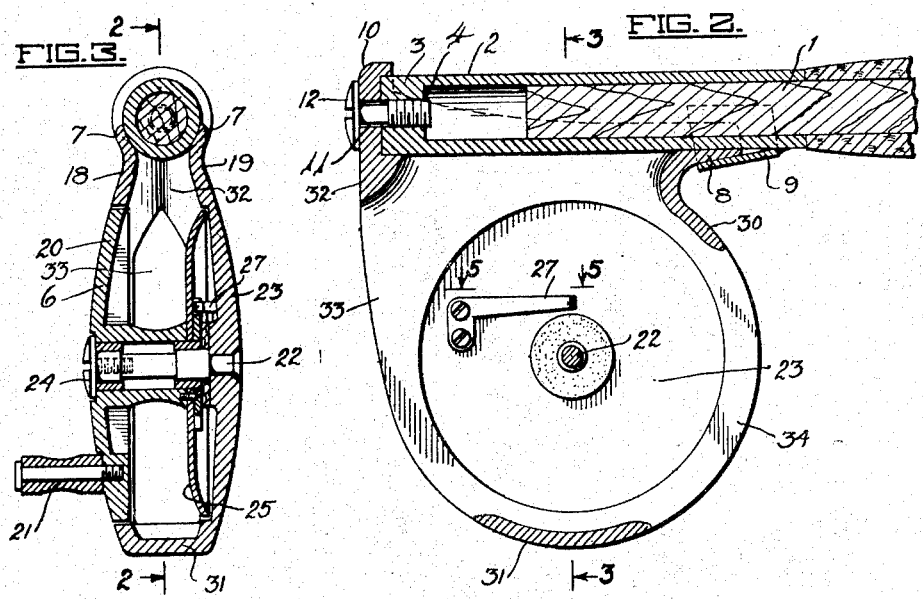
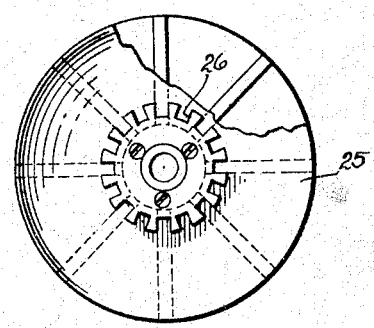
INVENTOR
LOREN W WHITCOMB
BY W. E. Beatty
ATTORNEY.

Feb. 20, 1940.    L. W. WHITCOMB    2,191,004
FISHING REEL
Filed Aug. 5, 1938    2 Sheets-Sheet 2
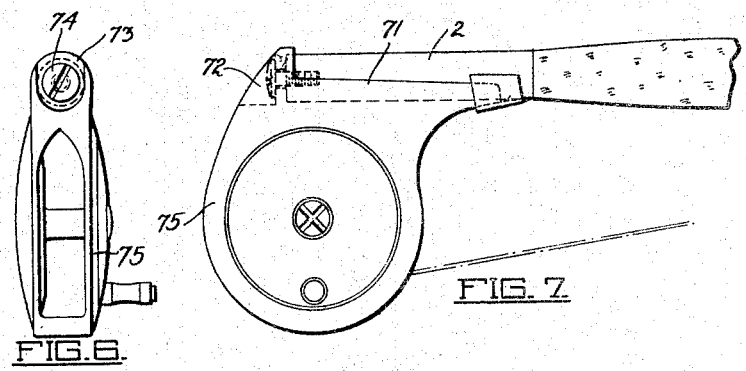
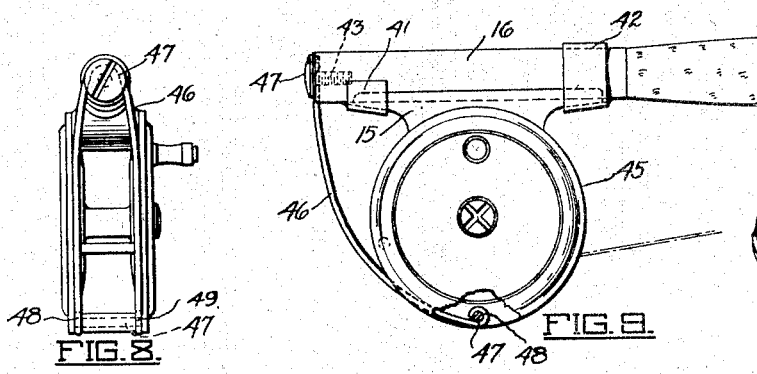
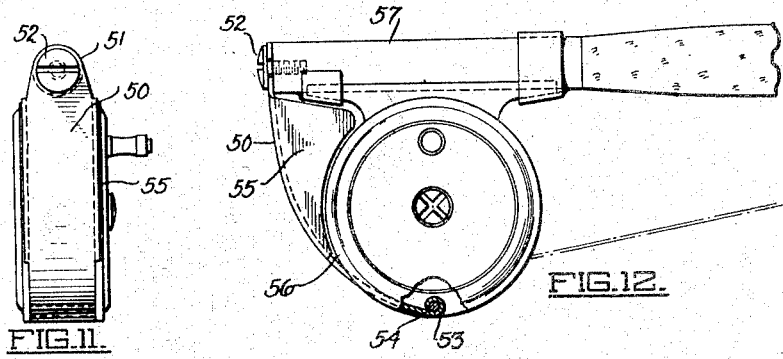
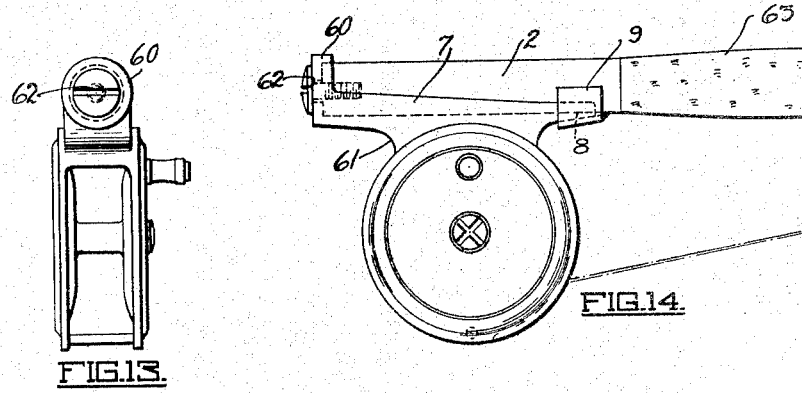
INVENTOR
LOREN W. WHITCOMB
BY
ATTORNEY.

Patented Feb. 20, 1940

2,191,004

UNITED STATES PATENT OFFICE 2,191,004

FISHING REEL

Loren W. Whitcomb, Glendale, Calif., assignor to Leonard Jean Gauthier, Los Angeles, Calif.

Application August 5, 1938, Serial No. 223,271

9 Claims. (Cl. 43—22)

The invention relates to a fishing reel and has for an object to improve the manner of holding a reel to a rod and to reduce the likelihood of the slack fishing line adjacent the reel from being caught around the end of the rod or between the end of the rod and the adjacent portion of the reel casing.

According to certain forms of the invention, the above features have been carried out in such a manner that the balance of the rod is improved due to the fact that the novel features herein provided make it possible to position the reel nearer to the end of the fishing rod than heretofore, whereby the point on the rod about which the rod pivots when the line is cast, is brought nearer to the top of the rod handle and adjacent the thumb of the caster.

For further details of the invention, reference may be made to the drawings wherein:

Fig. 1 is a side elevational view of a preferred form of the invention embodying both the improved fastening means and the improved line guard.

Fig. 2 is a sectional elevation of Fig. 1, taken on line 2—2 of Fig. 3.

Fig. 3 is a transverse, sectional elevation taken on line 3—3 of Fig. 2.

Fig. 4 is a side elevation of the inner end flange of the spool for the reel of Fig. 1, with a portion of the flange broken away.

Fig. 5 is a fragmentary section of line 5—5 of Fig. 2, showing the spring member of the click.

Figs. 6 and 7 are rear and side elevational views respectively of a modified form of reel wherein the reel is positioned nearer the end of the rod than in Fig. 1.

Figs. 8 and 9 are rear and side elevational views respectively of a further modification wherein the line guard of this invention is adapted for use with a standard type of reel.

Fig. 10 is an elevational view of the washer employed in connection with Figs. 8 and 9 for retaining the line guard on the end of the rod.

Figs. 11 and 12 are rear and side elevational views of a further modification wherein a modified form of line guard is adapted for use with a standard reel.

Figs. 13 and 14 are rear and side elevational views respectively of further modification wherein the improved reel retaining means is applied to a standard form of reel.

Referring to Figs. 1, 2 and 3, the invention is illustrated as applied to a reel for a rod commonly used for trout and other types of fishing, wherein for a right handed fisherman the reel depends from the rod with the spool handle on the right hand side thereof for the normal operation of casting and retrieving the line. According to this invention the core 1 of the fishing rod is provided with a metallic sleeve 2 having a closed end 3 provided with a screw threaded aperture 4. The reel according to this invention is fashioned so that it is adapted to embrace a portion of this sleeve and the end of the rod as shown in Figs. 1, 2 and 3. For this purpose the casing of the reel 5 having spool 6 rotatably mounted therein is provided with an elongated channel 7 which terminates at its front end in a tongue 8 adapted to be retained in the metal groove 9 fixed to sleeve 2, and channel 7 terminates at the other end in an end piece 10 forming a socket to receive the end of the rod or sleeve 2. As sleeve 2 is cemented or otherwise fixed to the core 1 of the rod, the end of the sleeve 2 in effect is the end of the rod. The end piece 10 is provided with an aperture 11 and a screw 12 passes through aperture 11 and is threaded into the screw threaded aperture 4 to retain the end of the rod in the socket formed by the end piece 10.

In order to reduce the likelihood of a slack portion of the fishing line from catching around the end of the rod or from catching in the space between the end of the rod and the adjacent portion of the reel casing, as shown in Fig. 1, I preferably conjoin the end piece 10 by a gradual sloping surface with the casing 5 of the reel. In this way, the surface of the casing from the end piece 10 to about the point 13 on the casing as shown in Fig. 1 serves as a line guard in avoiding a re-entrant curve over this region. The curved portion in question, that is, from the end piece 10 to the point about 13 in Fig. 1 is preferably convex to facilitate the line 14 when it is slack and around the casing, from being caught on and retained by the casing as would be the case for example with the reel shown in Fig. 9 if the line guard were not employed, the slack line in this case passing around the back of the reel and up through the re-entrant portion marked 15 and over the front side of the sleeve 16.

As shown in Fig. 3 the channel 7 may be formed by the reversely curved opposed sides 18 and 19 of the reel casing 5, the bottom of this channel being open and leading into the space where the spool 6 is mounted. The spool 6 itself is more or less conventional and comprises a front flange 20 having a convex curvature which forms a continuation of the curvature of the top and bottom adjacent portions of the casing 5. In flange 20 is mounted a handle 21 to wind the reel 6. The reel or spool 6 is rotatably mounted on a stud 22 which is fixed to the back 23 of the casing 5 and the spool 6 is retained on the stud 22 by means of removable screw 24. At the back of spool 6 and forming a part thereof is flange 25 suitably secured to which is a ratchet wheel 26 in cooperation with a spring pawl 27 mounted on the inside of the back wall 23 and forming the click as usual. Any other form of click or drag may be used.

The front and back sides of the casing 5 are held in their spaced relation as shown in Fig. 3 by cross members 30, 31, 32 each integral with the side walls. In other words, the periphery of the casing 5 is omitted or cut away to form an elongated opening 33 at the left side of the reel as shown in Fig. 2, and an elongated opening 34 at the right side. These openings serve to ventilate the portion of line 14 on the reel 6, and the line 14 is led from reel 6 through opening 34.

The whole reel casing 5 of Figs. 1–3, including channel 7, tongue 8, end piece 10, sides 18, 19 and cross members 30, 31, 32 are preferably made an integral unit by casting a light weight metal such as aluminum, or dural, which may be painted, or otherwise coated or surfaced.

In the modification shown in Figs. 6 and 7 substantially the same rod fastening means is employed as that shown in Fig. 1, except that the reel casing is pushed more towards the end of the rod whereby the flange or channel member 71 now extends substantially beyond the end of the sleeve 2 as at 72, the protruding portion 72 having an aperture 73 therein to receive the screw 74 which fastens the reel to the end of the rod 2. In this case as in Fig. 1, the end piece 72 conjoins the casing 75 by a convex curve to form a line guard. As in Fig. 1, the casing 75, channel member 71, member 72, etc., are preferably made an integral unit by casting of metal.

In Figs. 8, 9 and 10 a conventional reel 45 is shown and it may be held in place on the sleeve 16 by a fixed groove 41 and a slidable sleeve 42 as is well known. To provide this typically conventional reel with a line guard which is simple and economical in form, I provide a screw threaded aperture 43 in the end of the sleeve 16 (as in Fig. 2), and fashion an inverted U-shaped groove 44 as shown in Fig. 10 in the end of the sleeve 16. In groove 44 I retain the bight of a curved wire guard 46 by means of screw 47, the lower ends of the curved U-shaped guard 46 being suitably fastened at separated points on the usual reel post 47 by being bent therearound as shown at 48 and 49 in Figs. 9 and 10. The guard 46 is light in weight and prevents or reduces the possibility of a line catching around the portion marked 15 in Fig. 9 as explained above.

A modification of the guard 46 is shown in Figs. 11 and 12 wherein this guard takes the form of a metal stamping having a convex curved bottom portion 50 which terminates at its top in an apertured lug 51 adapted to be secured to the end of the rod by screw 52 and which terminates at its bottom portion in a circular apertured member 53 adapted to receive the cross bar 54 on a conventional reel. The curved portion 50 has arising therefrom on opposite sides thereof the flange 55 and a similar flange not shown therebehind, to substantially fill the space between the reel casing at a point marked 56 and the end of the rod sleeve 57. This also forms an economical line guard which is cheap to manufacture and readily adaptable to a standard type of reel.

In the modification shown in Figs. 13 and 14 I have shown the improved form of reel fastening means of Fig. 1 as applied to an otherwise conventional reel, without incorporating therein the line guard feature. The end piece 60 in this case differs from the end piece 10 in Fig. 1 in that the bottom thereof where it conjoins the channel 7 forms a re-entrant curve as indicated by 61, thereby providing a likely place for the slack line to catch as with the prior art construction. This reel fastening means has an advantage over the usual construction as illustrated at 41 and 42 in Fig. 9 in that there is avoided the use of a slidable sleeve or other locking means which is adapted to be accidentally manipulated by the hand holding the rod. The screw 62 in Fig. 14, as in all of the other figures in the drawings, is remote from the cork or other handle 63.

I claim:

1. A fishing reel for a rod handle, said reel comprising a spool casing, a spool therein, a line guard integral with said casing and terminating in a portion adapted to overlie the end of the rod handle, said overlying portion having means for securing the reel to the end of the rod handle.

2. In a fishing reel, a line guard therefor having a surface extending from a point where the end of the rod handle lies when the reel is in position on the rod to a point on the reel casing away from the rod handle, the distance from points on the line guard to the nearest point on the rod handle gradually increasing as the distance from the end of the rod increases, and fastening means for said line guard.

3. The combination of rod handle having a sleeve at the end thereof, a fishing reel therefor having a casing and rod fastening means for said casing comprising a channel rod receiving portion terminating at one end thereof in a tongue and terminating at the other end thereof in a socket adapted to removably receive the end of said sleeve, means for removably securing the end of said sleeve in said socket, and fastening means on said sleeve co-operating with said tongue.

4. The combination according to claim 3 wherein said casing comprises a line guard integral with said socket and said casing, said guard extending outwardly from said socket and merging with said casing at a point remote from said sleeve.

5. A fishing reel comprising an elongated rod receiving channel, an end piece at the rear of said channel, means for securing said end piece to the end of a fishing rod with the rod in said channel, rod securing means for said channel, and a reel casing fixed to said channel.

6. A fishing reel according to claim 5 comprising means conjoining said casing and said end piece and forming a line guard.

7. A fishing reel casing having reversely curved sides forming a rod receiving channel, and means for retaining a fishing rod in said channel.

8. A fishing reel casing having separated sides forming a rod socket, spaced cross members integral with said sides, and means for retaining a fishing rod in said socket.

9. A fishing reel comprising the combination of a line guard having a convex surface adapted to guide the line away from the end of the rod and around a reel on the rod, said line guard terminating in a socket adapted to receive the end of the rod, and means for retaining the end of the rod in said socket.

LOREN W. WHITCOMB.